(12) United States Patent
Haller

(10) Patent No.: US 10,853,878 B2
(45) Date of Patent: Dec. 1, 2020

(54) PAIRS TRADING SYSTEM AND METHOD

(71) Applicant: NYSE Group, Inc., New York, NY (US)

(72) Inventor: Thomas F. Haller, Longwood, FL (US)

(73) Assignee: NYSE Group, Inc., New York, NY (US)

(*) Notice: Subject to any disclaimer, the term of this patent is extended or adjusted under 35 U.S.C. 154(b) by 0 days.

(21) Appl. No.: 14/657,002

(22) Filed: Mar. 13, 2015

(65) Prior Publication Data

US 2015/0187007 A1 Jul. 2, 2015

Related U.S. Application Data

(60) Division of application No. 14/548,908, filed on Nov. 20, 2014, which is a continuation of application No. 14/191,152, filed on Feb. 26, 2014.

(60) Provisional application No. 61/779,899, filed on Mar. 13, 2013.

(51) Int. Cl.
*G06Q 40/04* (2012.01)

(52) U.S. Cl.
CPC .................... *G06Q 40/04* (2013.01)

(58) Field of Classification Search
CPC ......... G06Q 40/04; G06Q 40/00; G06Q 40/06
USPC .............................. 795/37; 705/37
See application file for complete search history.

(56) References Cited

U.S. PATENT DOCUMENTS

| | | | |
|---|---|---|---|
| 6,035,287 A * | 3/2000 | Stallaert | G06Q 40/04 |
| | | | 705/37 |
| 6,347,307 B1 | 2/2002 | Sandhu et al. | |
| 7,231,363 B1 | 6/2007 | Hughes et al. | |
| 7,412,415 B2 | 8/2008 | Waddell | |
| 7,685,040 B2 * | 3/2010 | Hodes | G06Q 40/00 |
| | | | 705/35 |
| 7,921,050 B1 * | 4/2011 | Chadwick | G06Q 10/00 |
| | | | 705/35 |
| 8,341,059 B1 | 12/2012 | Rubio | |
| 2001/0044770 A1 | 11/2001 | Keith | |
| 2003/0101129 A1 * | 5/2003 | Waddell | G06Q 40/04 |
| | | | 705/37 |
| 2004/0254804 A1 | 12/2004 | Peterffy et al. | |
| 2004/0267655 A1 * | 12/2004 | Davidowitz | G06Q 40/04 |
| | | | 705/37 |
| 2006/0089899 A1 | 4/2006 | Durkin et al. | |
| 2007/0005484 A1 | 1/2007 | Waelbroeck et al. | |
| 2009/0089202 A1 * | 4/2009 | Rowley | G06Q 40/04 |
| | | | 705/37 |
| 2009/0271308 A1 | 10/2009 | Maynard | |
| 2009/0292649 A1 | 11/2009 | Somech et al. | |
| 2010/0017323 A1 | 1/2010 | Zimmerman | |
| 2010/0274702 A1 | 10/2010 | Tzroya | |
| 2011/0040669 A1 | 2/2011 | Lee et al. | |
| 2011/0145126 A1 | 6/2011 | Rooney | |

(Continued)

OTHER PUBLICATIONS

Pierre Vadim Carlo Di Pierto; Essays in Empirical Asset Pricing; A dissertation, Northwestern University, Dec. 2007.*

(Continued)

*Primary Examiner* — Robert R Niquette
*Assistant Examiner* — Liz P Nguyen
(74) *Attorney, Agent, or Firm* — DLA Piper LLP (US)

(57) ABSTRACT

A trading platform adapted for pairs trading of unrelated securities from one or more asset classes using a single order approach is provided.

11 Claims, 4 Drawing Sheets

(56) References Cited

U.S. PATENT DOCUMENTS

2011/0233555 A1 9/2011 Rosenthal
2013/0006827 A1 1/2013 Kaus

OTHER PUBLICATIONS

Cummins, R.L., "Pairs-Trading: Testing the Consistency of a Statistical Arbitrage Investment Strategy," Erasmus University Rotterdam, School of Economics, https://pdfs.semanticscholar.org/48f3/705716e7ada460456b903a4f9f825dca7e91.pdf Nov. 2010. (Year: 2010).*
Investopedia, "What Was the First Company to Issue Stock?" Mar. 8, 2009. https://web.archive.org/web/20090308083918/https://www.investopedia.com/ask/answers/08/first-company-issue-stock-dutch-east-india.asp/ (Year: 2009)*
Wikipedia, "Jonathan's Coffee-House" Nov. 28, 2007. https://web.archive.org/web/20071128110742/http://en.wikipedia.org/wiki/Jonathan%27s_Coffee-House (Year: 2007).*
Broel-Plater, "A Wider Perspective on Pairs Trading," Department of Economics, School of Economics and Management Lund University, Sweden. May 26, 2010. https://pdfs.semanticscholar.org/039f/77d2c971d339ebf86df00052ae7aad661674.pdf (Year: 2010).*
Wang, "A High Performance Pair Trading Application," 2009 IEEE International Symposium on Parallel & Distributed Processing (pp. 1-8.) May 2009 (Year: 2009).*
George P. Gao, et al., "Institutional Ownership and Return Predictability Across Economically Unrelated Stocks," Jul. 13, 2012; 67 pages.
Securities and Exchange Commission by Chicago Board Options Exchange; Jul. 12, 2006; p. 1-13; www.sec.gov/rules/sro/cboe/2006/34-54135.pdf (Year: 2006).
Pasquariello et al., "Strategic Cross-Trading in the US Stock Market," Review of Finance (2015) 19: pp. 229-282, Dec. 24, 2013.
Kocherlakota, et al., "Household Heterogeneity and Asset Trade: Resolving the Equity Premium Puzzle in Three Countries," 47 pages, Jan. 2008.
Pasquariello, Paolo, "Imperfect Competition, Information Heterogeneity, and Financial Contagion," 56 pages, Jan. 13, 2003.

* cited by examiner

PAIRS TRADING SYSTEM AND METHOD

TECHNICAL FIELD

Embodiments of the disclosure relate generally to financial trading systems and, more specifically, to a pairs trading system and method.

BACKGROUND

Pairs trading is a strategy used by a trader to generate a return on investment by predicting a spread between two related securities, typically in the same sector, that tend to move together, wherein the trader takes a long position and a short position on the two related securities in the pair.

Traditionally, pairs trading is conducted among securities in the same market or, when dealing with options, using the same underlying security. However, there is presently no trading system that provides for pair trading of unrelated securities from different asset classes. Thus, traders wanting to trade unrelated securities, possibly across different asset classes, may only do so by submitting separate orders for each of the unrelated securities with the hope of executing both orders at the target parameters in the time period desired. Unfortunately, the separate order approach for conducting a pairs trade exposes traders to inherent leg risks and liquidity fragmentation.

Accordingly, there is a need for a trading platform adapted for pairs trading of unrelated securities from one or more asset classes using a single price movement provided by a single order approach.

SUMMARY

The present disclosure provides computer-implemented methods and systems for conducing pairs trades. In one exemplary embodiment, a computer-implemented method according to the present disclosure may include presenting a plurality of predefined pairs of unrelated articles, receiving a selection of a predefined pair from the predefined pairs for a pairs trade order, entering the pairs trade order as a single order in an order book, determining whether order parameters associated with a first leg and a second leg of the predefined pair have been met, and then executing the pairs trade order when the order parameters associated with said first and second legs are both met.

In another exemplary embodiment, a computer-implemented method according to the present disclosure may include receiving a request to pair at least two legs of unrelated securities, each associated with a different asset class, identifying a first security from a first asset class associated with a first leg, identifying a second security from a second asset class associated with a second let, determining whether the first and second legs form a tradable pair, and creating the requested pair of unrelated securities, where the requested pair is represented by a unique identifier.

An exemplary system according to the present disclosure may include a memory component and a processing component configured to execute and implement the various processing steps and features described above and throughout this disclosure.

BRIEF DESCRIPTION OF THE DRAWINGS

The present disclosure is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Figure 1:
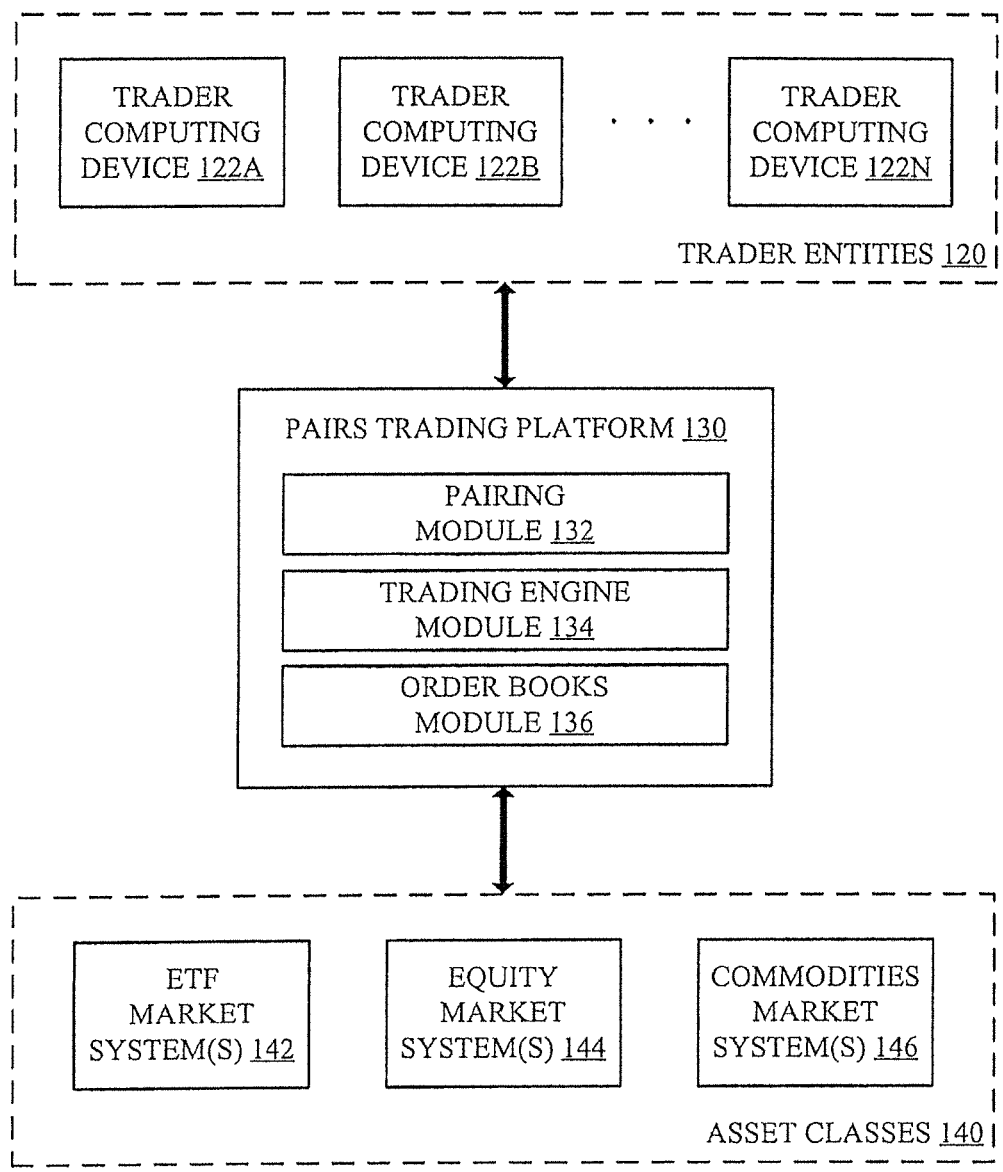
FIG. 1 is a block diagram illustrating an exemplary computer network in which embodiments of the present disclosure may operate.

Embodiments of the disclosure provide a system and methods for conducting cash equities pairs trading.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "receiving", "determining", "creating", "presenting", "selecting", "routing", "matching", "executing", "filling", "canceling", "processing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

FIG. 1 is a block diagram illustrating an exemplary computer network 100 in which embodiments of the present disclosure may operate. Referring to FIG. 1, computer network 100 may be comprised of a pairs trading platform 130, a plurality of trader computing devices 122A-122N adapted to conduct trades, which may be collectively referred to herein as trading entities 120, and market systems associated with regulating trading of a plurality of asset classes such as ETFs 142, equities 144, commodities 146 or any other suitable asset class, all of which may be collectively referred to herein as asset classes 140. In one embodiment, the computing devices of trading entities 120 and the market systems of asset classes 140 may be communicatively coupled to one or more networks (not shown) for transmitting and receiving trading-related data. Networks may be a private network (e.g., a local area network (LAN), wide area network (WAN), intranet, etc.) or a public network (e.g., the Internet).

Pairs trading platform 130 may be comprised of one or more modules configured enable and process orders relating to request for pairs trades received from trader entities 120. For example, pairs trading platform 130 may be comprised of a pairing module 132 and a trading engine module 134, order books module 136. Pairing module 132 may be configured to manage all aspects of creating and making available pre-defined pairs of unrelated securities for selection and trading by trader entities 120. Trading engine module 134 may be configured to manage all aspects of routing and matching pairs trading orders received from trader entities 120. Order books module 136 may be configured to manage all aspects of identifying and communicating with order books associated with the legs representing each of the securities in the pairs trade order received from trader entities 120.

Figure 2:
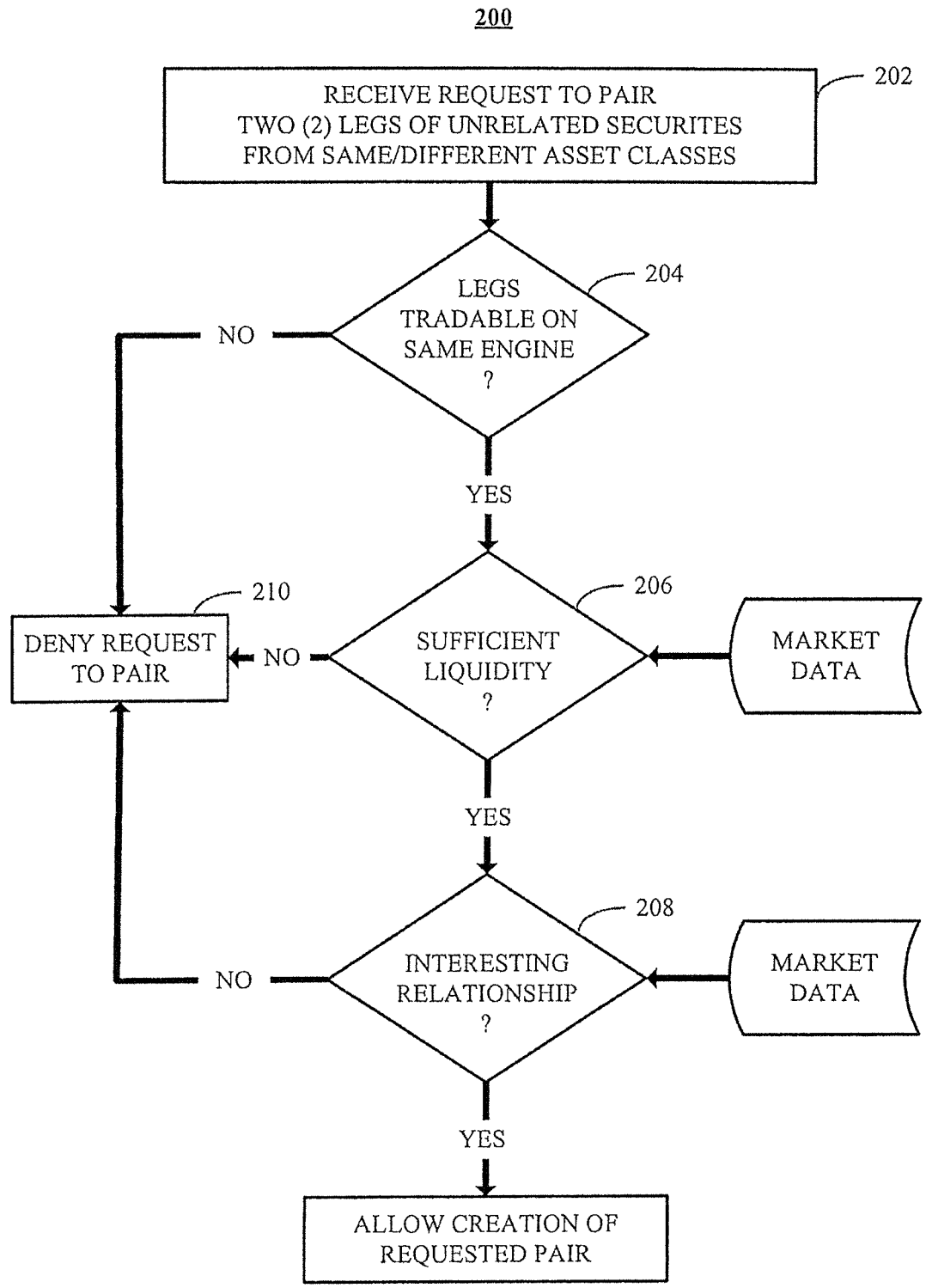
FIG. 2 is a flow diagram illustrating an embodiment of a method for pairing unrelated securities from one or more asset classes.
Figure 3:
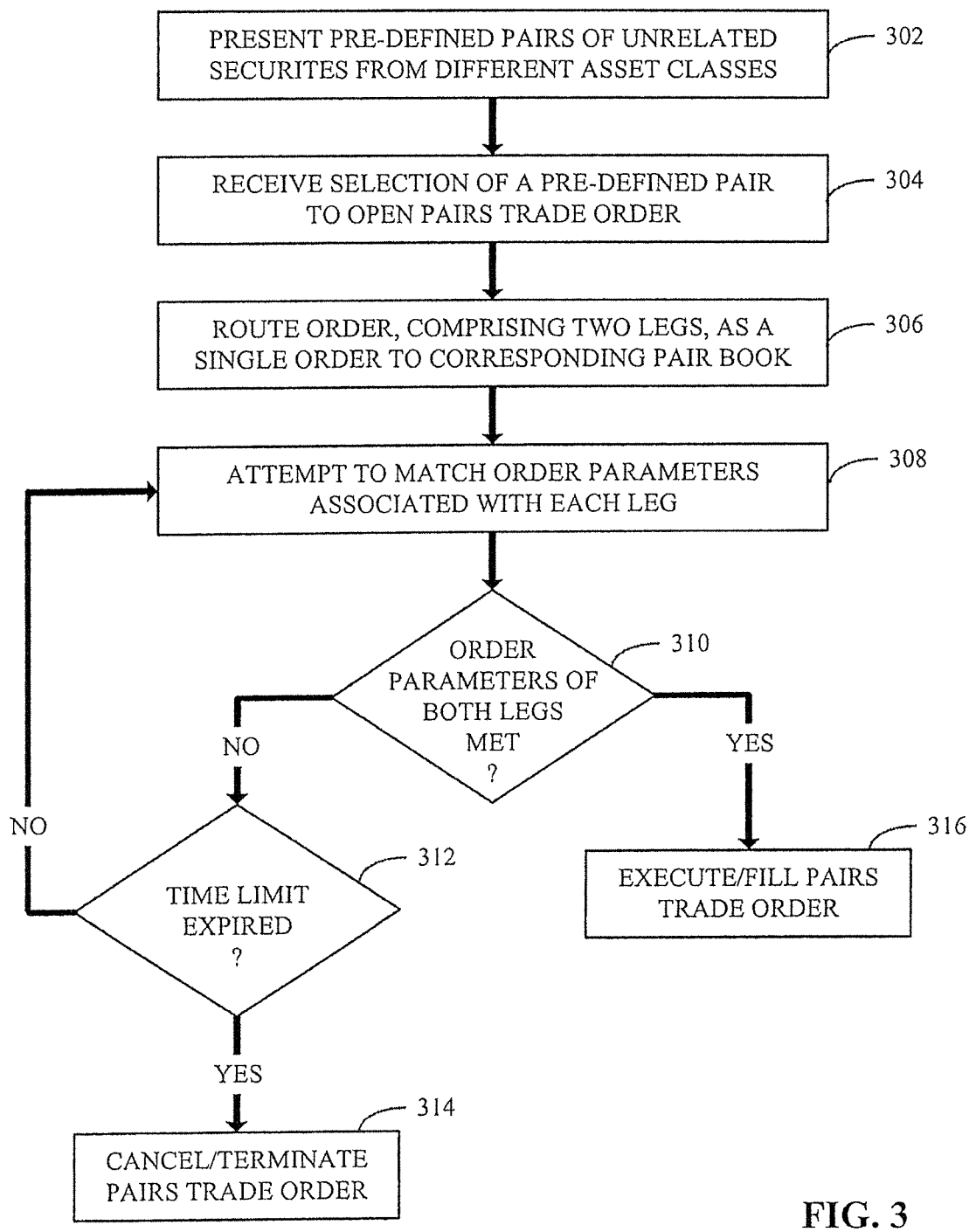
FIG. 3 is a flow diagram illustrating an embodiment of a method for trading pairs of unrelated securities from one or more asset classes.

Those skilled in the art will appreciate that pairs trading platform 130 may be configured with more or less modules to conduct the pairs trading methods described herein with reference to FIGS. 2 and 3. As illustrated in FIGS. 2 and 3, each of corresponding methods 200 and 300 may be performed by processing logic that may comprise hardware (e.g., circuitry, dedicated logic, programmable logic, microcode, etc.), software (such as instructions run on a processing device), or a combination thereof. In one embodiment, methods 200 and 300 may be performed by one or more processing components associated with modules 132, 134 and 136 of pairs trading platform 130.

FIG. 2 is a flow diagram illustrating a method 200 for pairing unrelated securities from one or more asset classes, according to an embodiment of the disclosure. Referring to FIG. 2, method 200 may be initiated upon receiving, at step 202, a request to pair two legs of unrelated securities from different asset classes. For example, a request may comprise pairing of Apple (AAPL) stock and Technology Select Sector SPDR (XLK), two unrelated securities from different asset classes (i.e., an equity and an ETF). In another embodiment, two legs of unrelated securities from the same asset class may also be paired. For example, a request may comprise pairing of SPDR Gold Shares (GLD) and SPDR S&P 500 (SPY), two unrelated securities from a related asset class (i.e., ETFs).

Upon receiving a request to pair unrelated securities, an initial determination may be made, at step 204, to ascertain whether legs representative of each of the securities in the requested pairing may be traded together. For example, pairing module 132 may check whether trading engine module 134 is configured to accommodate both legs of the unrelated securities identified in the requested pairing. If an affirmative determination is made at step 204, then a second determination may be made, at step 206, to ascertain whether sufficient liquidity is present in connection with each of die unrelated securities to accommodate the requested pairing. If an affirmative determination is made at step 206, then a third determination may be made, at step 208, to ascertain whether an interesting relationship (e.g., criteria defining investor demand levels, trading patterns between the unrelated securities or any other applicable measure) exists between each of the unrelated securities to accommodate the requested pairing. Determinations relating to the presence of sufficient liquidity and an interesting relationship may be based on market-driven data received, for example, by pairs trading module 130.

When an affirmative determination is made at steps 204, 206 and 208, then the requested pairing of unrelated securities may be created, at step 210, and made available for selection by trader entities 120. However, if one or more of the determinations made at steps 204, 206 and 208 are not affirmed, then pairing module 132 may be configured to deny, at step 212, the requesting pairing.

FIG. 3 is a flow diagram illustrating a method 300 for trading pairs of unrelated securities from one or more asset classes, according to an embodiment of the disclosure. Referring to FIG. 3, method 300 may be initiated upon presenting, at step 302, predefined pairs of unrelated securities from one or more asset classes. Selection of a predefined pair may be received, at step 304, to open a pairs trade order. For example, trading entities 120 may search and select from a listing of predefined pairs of unrelated securities that are available for trading via pairs trading platform 130.

After a predefined pair is selected and a corresponding pairs trade order is opened, the trade order may be routed, at step 306, to a pairs order book for orders received in connection with the predefined pair selected. For example, the securities GLD and SPY may be provided as a predefined pair identified as "GLDSPY" and, upon selection, may be routed to a pairs order book provided for receiving orders relating to GLDSPY. Although the trade order is comprised of legs representative of each of the underlying securities in the predefined pair, it is received by the corresponding pairs order book as a single trade order (i.e., not separate orders for each leg in the pair).

Once the pairs trade order is entered into the corresponding pairs order book, an attempt may then be made, at step 308, to match order parameters associated with each leg of the paired securities. In one embodiment, pairs trading platform 130 may attempt to match order parameters for each leg of the paired securities using other pairs trade orders in the pairs order book meeting the order parameters. In another embodiment, pairs trading platform 130 may attempt to match order parameters through order books corresponding to the security represented by each leg in the pair.

A determination may be made, at step 310, to ascertain whether order parameters of both legs are met. If, and only if, order parameters associated with each leg of the paired securities are met, then may the pairs trade order be filled, at step 316, thereby making a pairs trade order transaction riskless from an execution standpoint. If, however, order parameters associated with either leg of the paired securities are not met, then a determination may be made, at step 312, to ascertain whether a time limit for conducting the pairs trade has expired. If the time period has not expired, pairs trading platform 130 may continue to attempt, at step 308, matching the pairs trade order. If the time period has expired and the pairs trade order is not filled, the pairs trade order may be canceled, at step 314.

It should be noted that the sequence of operations described in conjunction with methods 200 and 300 may be different from that illustrated, respectively, in corresponding FIGS. 2 and 3. For example, the operations at step 208 may be executed before the operations at step 206, as illustrated in method 200 of FIG. 2.

Figure 4:
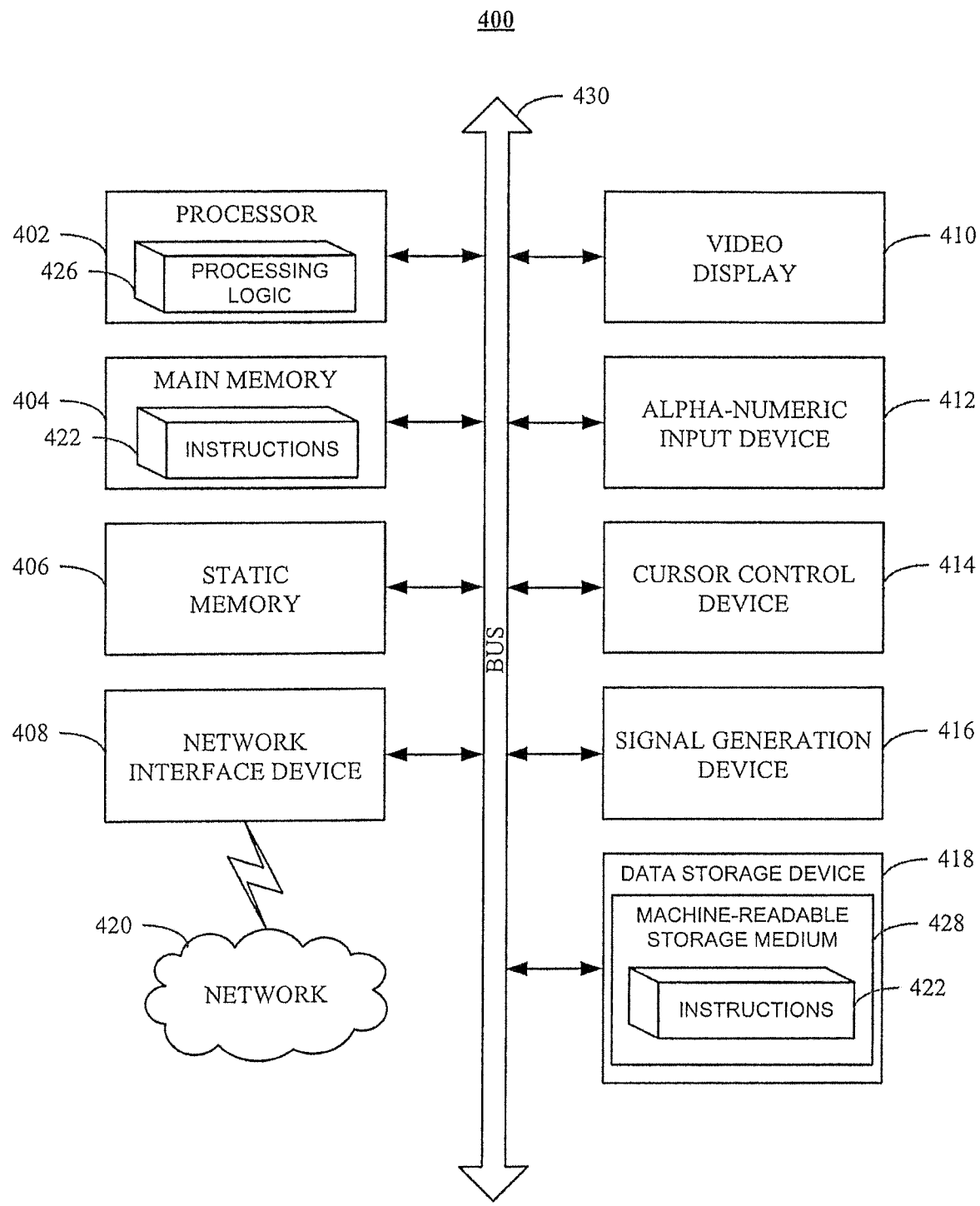
FIG. 4 illustrates a diagrammatic representation of a machine in the exemplary form of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in die capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 may be comprised of a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute processing logic 426 for performing the operations and steps discussed herein.

Computer system 400 may further include a network interface device 408. Computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

Data storage device 418 may include a machine-readable storage medium (or more specifically a computer-readable storage medium) 428 having one or more sets of instructions (e.g., software 422) embodying any one or more of the methodologies of functions described herein. For example, software 422 may store instructions to conduct a cash equities pairs trade. Software 422 may also reside, completely or at least partially, within main memory 404 and/or within processing device 402 during execution thereof by computer system 400; main memory 404 and processing device 402 also constituting machine-readable storage media. Software 422 may further be transmitted or received over a network 420 via network interface device 408.

Machine-readable storage medium 428 may also be used to store instructions to conduct a cash equities pairs trade. While machine-readable storage medium 428 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of die present disclosure. The term "machine-readable storage medium" shall accordingly be taken to include, but not be limited to, solid-state memories, and optical and magnetic media.

Whereas many alterations and modifications of the present disclosure will no doubt become apparent to a person of ordinary skill in the art after having read the foregoing description, it is to be understood that any particular embodiment described and shown by way of illustration is in no way intended to be considered limiting. Therefore, references to details of various embodiments are not intended to limit the scope of the claims, which in themselves recite only those features regarded as the disclosure.

The invention claimed is:

1. A computer-implemented method, said method comprising:
   in a computer system comprising a pairing module, a trading engine module, an order books module and at least one database, said database defining an order book associated with a unique identifier and storing data defining pre-defined pairs of unrelated securities corresponding to the unique identifier as single orders in said order book:
   displaying, on a display device of at least one trader computing device, in a searchable and selectable format, the pre-defined pairs of unrelated securities, the at least one trader computing device being among one or more remote trader computing devices;
   receiving, by the pairing module, from the display device, input comprising a request to pair a combination of a first proposed leg and a second proposed leg of unrelated securities associated with different asset classes, said combination absent from among the pre-defined pairs;
   assessing, by the pairing module, aspects of both the first proposed leg and the second proposed leg together with capabilities of the trading engine module to determine whether the trading engine module is configured to both match and execute the first proposed leg and the second proposed leg as a single transaction;
   creating, by the pairing module, a pair of said combination and assigning a new unique identifier to said combination when it is determined that the trading engine module is configured to both match and execute the first proposed leg and the second proposed leg as the single transaction;
   displaying, on at least one among the one or more remote trader computing devices, the created pair together with the pre-defined pairs in the searchable and selectable format;
   receiving, by the pairing module, order information associated with the created pair of said unrelated securities from among at least one of the one or more remote trader computing devices; and
   creating, by the trading engine module, a pairs trade order corresponding to the created pair of said unrelated securities including the new unique identifier, based on the received order information.

2. The computer-implemented method of claim 1, wherein the predetermined criteria further comprises a measure of liquidity and determining whether said first proposed leg and said second proposed leg are tradable as a pair comprises determining if the measure of liquidity is sufficient to accommodate the request to pair in a market for said first proposed leg and said second proposed leg.

3. The computer-implemented method of claim 2, wherein the predefined criteria comprises at least one of investor demand levels and trading patterns.

4. A computer system comprising:
   a memory component;
   at least one database defining an order book associated with a unique identifier, said database configured to store data defining pre-defined pairs of unrelated securities corresponding to the unique identifier as single orders in said order book;
   a processing component coupled to said memory component, wherein the processing component comprises a pairs trading platform, the pairs trading platform comprising a pairing module, a trading engine module, and an order book module, the pairs trading platform configured to:
   display, on a display device of at least one trader computing device, in a searchable and selectable format, the pre-defined pairs of unrelated securities, the at least one trader computing device being among one or more remote trader computing devices;
   receive, at the pairing module, from the display device, input comprising a request to pair a combination of a first proposed leg and a second proposed leg of unrelated securities associated with different asset classes, said combination absent from among the pre-defined pairs;
   assess, by the pairing module, aspects of both the first proposed leg and the second proposed leg together with capabilities of the trading engine module to determine whether the trading engine module is configured to both match and execute the first proposed leg and the second proposed leg as a single transaction;
   create, at the pairing module, a pair of said combination and assign a new unique identifier to said combination, when it is determined that the trading engine module is configured to both match and execute the first proposed leg and the second proposed leg as the single transaction;
   display, on at least one among the one or more remote trader computing devices, the created pair together with the pre-defined pairs in the searchable and selectable format;
   receive, by the pairing module, order information associated with the created pair of said unrelated securities from among at least one of the one or more remote trader computing devices; and
   create, by the trading engine module, a pairs trade order corresponding to the created pair of said unrelated securities including the new unique identifier, based on the received order information.

5. The computer-implemented method of claim 1, further comprising:
   storing, by the order book module, the pairs trade order in a corresponding order book according to the new unique identifier of said created pair.

6. The computer-implemented method of claim 1, further comprising:
   receiving, by the pairing module from multiple market systems across one or more networks, market-driven data associated with said different asset classes, wherein each of the multiple market systems transmits market-driven data associated with a respective one of the different asset classes to said pairing module; and
   comparing, by the pairing module, the market-driven data to predetermined criteria of each of the first proposed leg and the second proposed leg to determine whether said first proposed leg and said second proposed leg are tradable as a pair,
   said creating of said combination further comprising creating said combination when it is further determined that the first proposed leg and the second proposed leg are tradable as a pair.

7. The computer-implemented method of claim 1, further comprising:
   causing, by the pairing module, the at least one among the one or more remote trader computing devices to automatically present the created pair of said unrelated securities to at least one trader entity for selection according to the searchable and selectable format, said receiving of the order information further comprising receiving a selection of the created pair of said unrelated securities that is presented from the at least one among the one or more remote trader computing devices.

8. The computer system of claim 4, wherein the pairs trading platform is further configured to:

receive, at the pairing module from multiple market systems across one or more networks, market-driven data associated with said different asset classes, wherein each of the multiple market systems transmits market-driven data associated with a respective one of the different asset classes to said pairing module; and compare, at the pairing module, the market-driven data to predetermined criteria of each of the first proposed leg and the second proposed leg to determine whether said first proposed leg and said second proposed leg are tradable as a pair, said pairing module is configured to create said combination when it is further determined that the first proposed leg and the second proposed leg are tradable as a pair.

9. The computer system of claim 4, the pairs trading platform is further configured to:

cause, by the pairing module, the at least one among the one or more remote trader computing devices to automatically present the created pair of said unrelated securities to at least one trader entity for selection according to the searchable and selectable format, said receiving, by said pairing module, of the order information further comprises receiving a selection of the created pair of said unrelated securities that is presented from the at least one among the one or more remote trader computing devices.

10. The computer-implemented method of claim 1, the method further comprising:

entering, by the order books module, said pairs trade order as a single order into a corresponding order book based on the new unique identifier included in the pairs trade order, the pairs trade order having order parameters, a portion of the order parameters associated with the first proposed leg, another portion of the order parameters associated with the second proposed leg;

automatically matching, by the trading engine module, information in other trade orders to the order parameters of the pairs trade order entered in the corresponding order book;

determining, by the trading engine module, whether the order parameters associated with each leg of the entered pairs trade order are met; and causing, by the trading engine module, at least one computer to automatically execute the pairs trade order as the single transaction when the order parameters are met.

11. The computer system of claim 4, wherein the pairs trading platform is further configured to:

enter, by the order books module, said pairs trade order as a single order into a corresponding order book based on the new unique identifier included in the pairs trade order, the pairs trade order having order parameters, a portion of the order parameters associated with the first proposed leg, another portion of the order parameters associated with the second proposed leg;

automatically match, by the trading engine module, information in other trade orders to the order parameters of the pairs trade order entered in to the corresponding order book;

determine, by the trading engine module, whether the order parameters associated with each leg of the entered pairs trade order are met; and cause, by the trading engine module, the pairs trading platform to automatically execute the pairs trade order as the single transaction when the order parameters are met.

* * * * *